US011908605B2

(12) United States Patent
Zhai

(10) Patent No.: US 11,908,605 B2
(45) Date of Patent: Feb. 20, 2024

(54) INTEGRATED MAGNETICS WITH CLOSED-LOOP FLUX PATH

(71) Applicant: SG MICRO (SUZHOU) LIMITED, Suzhou (CN)

(72) Inventor: Jerry Zhijun Zhai, Toronto (CA)

(73) Assignee: SG MICRO (SUZHOU) LIMITED, Suzhou (CN)

( * ) Notice: Subject to any disclaimer, the term of this patent is extended or adjusted under 35 U.S.C. 154(b) by 768 days.

(21) Appl. No.: 16/677,275

(22) Filed: Nov. 7, 2019

(65) Prior Publication Data

US 2020/0152371 A1 May 14, 2020

Related U.S. Application Data

(60) Provisional application No. 62/760,365, filed on Nov. 13, 2018.

(51) Int. Cl.

| | |
|---|---|
| ***H01F 27/29*** | (2006.01) |
| ***H01F 38/12*** | (2006.01) |
| ***H01F 5/00*** | (2006.01) |
| ***H01F 27/28*** | (2006.01) |
| ***H01F 27/255*** | (2006.01) |
| ***H01F 27/32*** | (2006.01) |
| ***H01F 41/04*** | (2006.01) |

(52) U.S. Cl.

CPC ....... *H01F 27/2804* (2013.01); *H01F 27/255* (2013.01); *H01F 27/323* (2013.01); *H01F 41/041* (2013.01); *H01F 2027/2809* (2013.01)

(58) Field of Classification Search

CPC .. H01F 41/041; H01F 27/323; H01F 27/2804; H01F 27/255

USPC ........................................................... 336/200

See application file for complete search history.

(56) References Cited

U.S. PATENT DOCUMENTS 8,487,445 B1 * 7/2013 Do .......................... H01L 24/14 257/773

2003/0075797 A1 * 4/2003 Suzuki .................. H01L 21/561 257/E23.079

2005/0190035 A1 * 9/2005 Wang .................. H01F 17/0013 336/200

(Continued)

*Primary Examiner* — Jared Fureman

*Assistant Examiner* — Lucy M Thomas

(74) *Attorney, Agent, or Firm* — Bayramoglu Law Offices LLC

(57) ABSTRACT

Integrated magnetics techniques for incorporating inductor, coupled inductor, and/or transformer functions of power electronics and high frequency circuits onto small, integrated structures, while maintaining a high quality factor and a high inductance density. The integrated magnetics techniques include incorporating magnetic vias into the inductive elements to form closed magnetic loops for reducing the reluctance to magnetic flux, while increasing the inductance of the inductive elements. The small integrated structures can be configured as integrated laminate structures, in which multiple layers of semiconductor chips, magnetic layers, capacitive layers, conductive layers, and/or dielectric layers are vertically laminated together to form electronic circuits for use in smart phones, tablet computers, notebook computers, wearable electronic devices, portable medical devices, server computers, networking equipment, industrial equipment, and/or any other suitable devices, computers, systems, and/or equipment.

14 Claims, 7 Drawing Sheets

(56) References Cited

U.S. PATENT DOCUMENTS

| | | | | |
|---|---|---|---|---|
| 2012/0169823 | A1* | 7/2012 | Leoni | B41J 2/1639 29/890.1 |
| 2014/0176286 | A1* | 6/2014 | Okada | H01F 17/0013 336/200 |
| 2015/0302974 | A1* | 10/2015 | Zhao | H01F 41/046 336/200 |
| 2017/0133152 | A1* | 5/2017 | Kouchi | H02J 50/005 |
| 2018/0033544 | A1* | 2/2018 | Nakajima | H01F 27/29 |

* cited by examiner

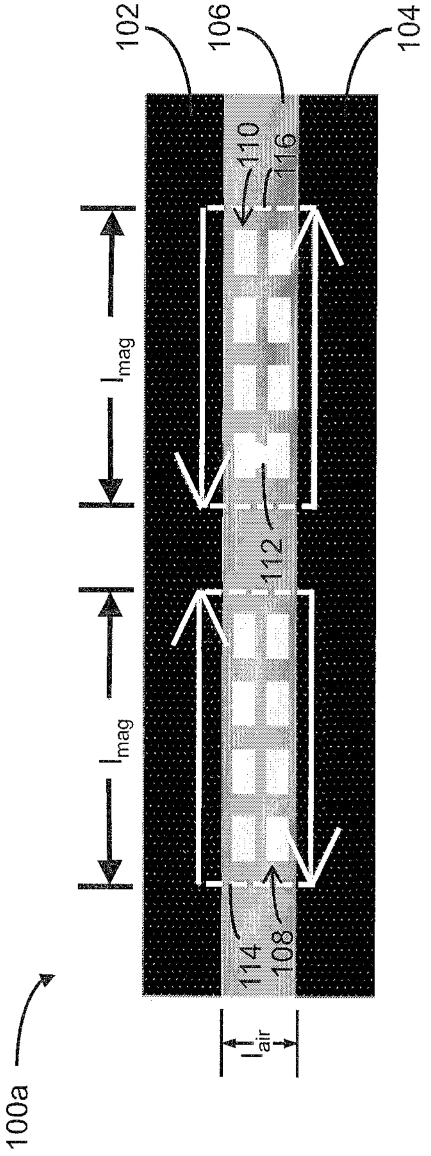
*Fig. 1a – Prior art*
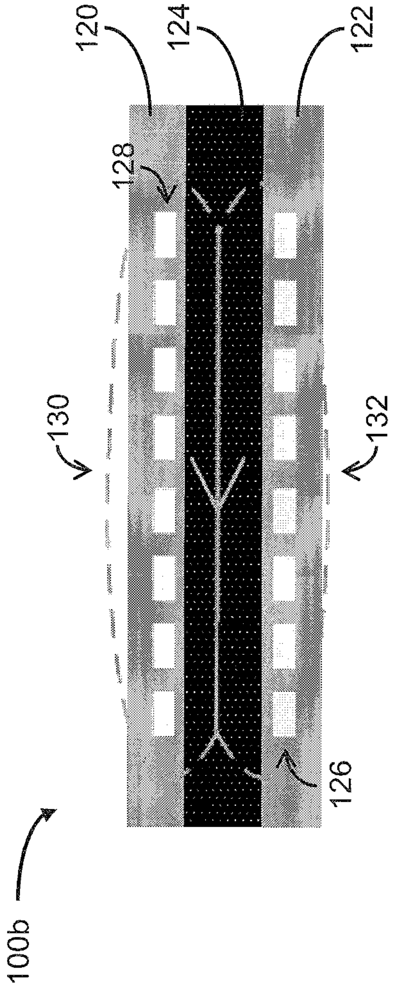
*Fig. 1b – Prior art*

INTEGRATED MAGNETICS WITH CLOSED-LOOP FLUX PATH

CROSS REFERENCE TO RELATED APPLICATIONS

This application claims benefit of the priority of U.S. Provisional Patent Application No. 62/760,365 filed Nov. 13, 2018 entitled INTEGRATED MAGNETICS WITH CLOSED-LOOP FLUX PATH.

BACKGROUND

Magnetic or inductive components such as inductors and transformers are employed in power electronics such as switching power supplies, switching voltage regulators, isolated power converters, power factor correction converters, and filters in linear voltage regulators, as well as in high frequency analog integrated circuits (ICs), radio frequency (RF) transmitters, micro-electro-mechanical systems (MEMS), sensors, and so on. Integrated magnetics techniques are employed by design engineers in an effort to incorporate the inductor and transformer functions of such power electronics, high frequency analog ICs, among others, onto a small, integrated structure.

SUMMARY

Integrated magnetics techniques can present several challenges to a design engineer, however. For example, it may be desirable to have an inductor with both a high quality factor and a high inductance density. The quality factor, Q(ω), of an inductor can provide an indication of the inductor's performance, and can be expressed, as follows:

$$Q(\omega) = \omega \times \frac{\text{(maximum energy stored)}}{\text{(power loss)}}, \quad (1)$$

in which "ω" corresponds to the angular frequency at which the "maximum energy stored" and the "power loss" are measured. However, in integrated magnetics, it can be difficult to obtain a high quality factor while also maintaining a high inductance density, due to the presence of air gap reluctance in the magnetic flux path of the inductor.

Integrated magnetics (IM) techniques are disclosed herein for incorporating inductor and/or transformer functions of power electronics, high frequency analog ICs, among others, onto small, integrated structures, while maintaining both a high quality factor of the inductive elements and a high inductance density. The disclosed IM techniques can include incorporating magnetic interconnects or "vias" into the inductive elements to form closed magnetic loops configured to reduce the reluctance to magnetic flux, thereby increasing the inductance of the inductive elements. The integrated structures can be configured as integrated laminate structures, in which multiple layers of semiconductor chips, magnetic layers, capacitive layers, conductive layers, and/or dielectric layers are vertically laminated together to form electronic circuits for use in smart phones, tablet computers, notebook computers, wearable electronic devices, portable medical devices, server computers, networking equipment, industrial equipment, and/or any other suitable devices, computers, systems, and/or equipment. Such an integrated laminate structure can include magnetic layers disposed at the top and at the bottom of the integrated laminate structure, and magnetic vias configured to interconnect the top and bottom magnetic layers, thereby forming a closed magnetic loop for the magnetic flux through the integrated laminate structure. The integrated laminate structure can further include one or more conductive layers etched to form patterned copper traces in the respective conductive layers. Thin dielectric walls can vertically surround the magnetic vias to provide voltage isolation between the magnetic vias and the patterned copper traces in the respective conductive layers. The magnetic vias can be disposed at predetermined locations in the integrated laminate structure to provide electromagnetic coupling among the magnetic vias, the top magnetic layer, the bottom magnetic layer, and/or the patterned copper traces of the respective conductive layers.

In certain embodiments, an integrated magnetics (IM) structure includes a first magnetic layer, a second magnetic layer, and one or more conductive layers disposed between the first magnetic layer and the second magnetic layer. The one or more conductive layers are etched to form patterned metal traces. The IM structure further includes a first magnetic via and a second magnetic via. The first and second magnetic vias are disposed on opposite sides of at least a portion of the patterned metal traces. The first and second magnetic vias are each configured to interconnect the first magnetic layer and the second magnetic layer. The patterned metal traces are configured, when electrical current flows through the patterned metal traces, to induce a magnetic flux through a flux path defined as a closed magnetic loop, which traverses the first magnetic via, the first magnetic layer, the second magnetic via, and the second magnetic layer and encircles at least the portion of the patterned metal traces.

In certain arrangements, the IM structure includes a first dielectric layer. The patterned metal traces are embedded in the first dielectric layer.

In certain arrangements, the IM structure includes a first hole configured to extend through the first magnetic layer, the first dielectric layer, and the second magnetic layer. The first magnetic via is formed in the first hole.

In certain arrangements, the IM structure includes a second hole configured to extend through the first magnetic layer, the first dielectric layer, and the second magnetic layer. The second magnetic via is formed in the second hole.

In certain arrangements, the IM structure includes a magnetic paste that fills each of the first hole and the second hole. The magnetic paste is a mixture of epoxy and magnetic particles.

In certain arrangements, the magnetic particles include larger magnetic particles and smaller magnetic particles. The respective magnetic particles have sizes ranging from about 100 nanometers (nm) to 35 nm.

In certain arrangements, the IM structure includes a first wall of epoxy resin paste disposed in the first hole to surround the first magnetic via.

In certain arrangements, the IM structure includes a second wall of epoxy resin paste disposed in the second hole to surround the second magnetic via.

In certain arrangements, the first and second walls of epoxy resin paste each have a thickness ranging from about 10 micrometers (μm) to 100 μm.

In certain arrangements, the patterned metal traces are spaced apart from each of the first and second walls of epoxy resin paste by a distance ranging from about 20 μm to 500 μm.

In certain arrangements, the IM structure includes a second dielectric layer disposed between the first magnetic layer and the first dielectric layer.

In certain arrangements, the IM structure includes a third dielectric layer disposed between the first dielectric layer and the second magnetic layer.

In certain arrangements, the IM structure includes a fourth dielectric layer. The first magnetic layer is disposed between the second dielectric layer and the fourth dielectric layer. In certain arrangements, the IM structure includes a fifth dielectric layer. The second magnetic layer is disposed between the third dielectric layer and the fifth dielectric layer.

In certain arrangements, the patterned metal traces are configured to form one or more sets of windings of one or more inductors.

In certain arrangements, the patterned metal traces are configured to form one or more sets of windings of a transformer.

In certain embodiments, a method of fabricating an integrated magnetics (IM) structure includes etching one or more conductive layers to form patterned metal traces, laminating the one or more conductive layers between a first magnetic layer and a second magnetic layer, forming a first magnetic via to interconnect the first magnetic layer and the second magnetic layer, and forming a second magnetic via to interconnect the first magnetic layer and the second magnetic layer. The first and second magnetic vias are formed on opposite sides of at least a portion of the patterned metal traces, thereby defining a flux path as a closed magnetic loop that traverses the first magnetic via, the first magnetic layer, the second magnetic via, and the second magnetic layer and encircles at least the portion of the patterned metal traces.

In certain arrangements, the method includes embedding the patterned metal traces in a dielectric layer.

Other functions and aspects of the claimed features of this disclosure will be evident from the Detailed Description that follows.

BRIEF DESCRIPTION OF THE DRAWINGS

The foregoing and other objects, features and advantages will be apparent from the following description of particular embodiments of the disclosure, as illustrated in the accompanying drawings, in which like reference characters refer to the same parts throughout the different views.

FIG. 1*a* illustrates a first conventional integrated magnetics (IM) structure;

FIG. 1*b* illustrates a second conventional IM structure;

DETAILED DESCRIPTION

Figure 2A:
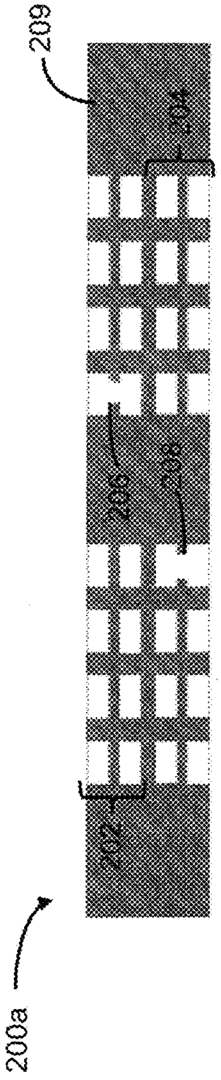
FIGS. 2*a*-2*e* illustrate a first exemplary IM structure during sequential phases of fabrication, in which the first exemplary IM structure is configured as an integrated laminate structure that includes a top magnetic layer, a bottom magnetic layer, and a plurality of magnetic vias interconnecting the top and bottom magnetic layers.

The disclosure of U.S. Provisional Patent Application No. 62/760,365 filed Nov. 13, 2018 entitled INTEGRATED MAGNETICS WITH CLOSED-LOOP FLUX PATH is hereby incorporated herein by reference in its entirety.

Integrated magnetics techniques are disclosed herein for incorporating inductor, coupled inductor, and/or transformer functions of power electronics and high frequency circuits onto small, integrated structures, while maintaining a high quality factor of inductive elements and a high inductance density. The integrated magnetics techniques include incorporating magnetic vias into the inductive elements to form closed magnetic loops for reducing the reluctance to magnetic flux, while increasing the inductance of the inductive elements. The integrated structures can be configured as integrated laminate structures, in which multiple layers of semiconductor chips, magnetic layers, capacitive layers, conductive layers, and/or dielectric layers are vertically laminated together to form electronic circuits for use in smart phones, tablet computers, notebook computers, wearable electronic devices, portable medical devices, server computers, networking equipment, industrial equipment, and/or any other suitable devices, computers, systems, and/or equipment.

FIG. 1*a* depicts a cross-sectional view of a conventional integrated magnetics (IM) structure 100*a*. As shown in FIG. 1*a*, the conventional IM structure 100*a* includes a top magnetic layer 102, a bottom magnetic layer 104, and a dielectric layer 106 disposed between the top and bottom magnetic layers 102, 104. The conventional IM structure 100*a* further includes a conductive layer 108 and a conductive layer 110, each of which is etched to form patterned metal (e.g., copper) traces in the respective conductive layers 108, 110. For example, the conventional IM structure 100*a* may correspond to at least part of an inductor or a transformer, and the patterned copper traces formed in the respective conductive layers 108, 110 may correspond to a plurality of copper lines or windings embedded in the dielectric layer 106.

It is noted that a metal (e.g., copper) via 112 can be configured to vertically interconnect the conductive layers 108, 110.

As further shown in FIG. 1*a*, a first magnetic flux can be generated along a path 114, and a second magnetic flux can be generated along a path 116, through the conventional IM structure 100*a*. For example, the magnetic flux path 114 may traverse (i) horizontally through the top magnetic layer 102, (ii) vertically through the dielectric layer 106, (iii) horizontally through the bottom magnetic layer 104, and (iv) vertically again through the dielectric layer 106, thereby effectively encircling, in a clockwise fashion, a first set of copper windings formed in the conductive layers 108, 110. Further, the magnetic flux path 116 may traverse (i) horizontally through the top magnetic layer 102, (ii) vertically through the dielectric layer 106, (iii) horizontally through the bottom magnetic layer 104, and (iv) vertically again through the dielectric layer 106, thereby effectively encircling, in a counter-clockwise fashion, a second set of copper windings formed in the conductive layers 108, 110.

In the conventional IM structure 100*a*, the inductance density is strongly influenced by its reluctance to magnetic flux, such as the first magnetic flux generated along the path 114, and the second magnetic flux generated along the path 116. For example, for each of the magnetic flux paths 114, 116, the reluctance to magnetic flux (also referred to herein as the "magnetic reluctance") due to the top and bottom magnetic layers 102, 104 may be expressed, as follows:

$$\text{Magnetic Reluctance of Magnetic Layers} = 2 * \frac{l_{mag}}{\mu_{r\_mag}} * \frac{1}{\mu_0 A_e}, \quad (2)$$

in which "$l_{mag}$" corresponds to the magnetic flux path length through a respective magnetic layer, "$\mu_{r\_mag}$" corresponds to the relative permeability of the respective magnetic layer, "$\mu_0$" corresponds to the permeability of air (which is constant), and "$A_e$" corresponds to the effective magnetic area of the respective magnetic layer. It is noted that the permeability of the dielectric layer 106 is typically about the same as the permeability of air. It is further noted that the relative permeability of the respective magnetic layer (i.e., $\mu_{r\_mag}$) is dependent upon the electromagnetic properties of the magnetic material. For example, ferrite-based magnetic materials typically have a relative permeability ranging from about 100 to 3000.

Further, for each of the magnetic flux paths 114, 116, the magnetic reluctance due to the dielectric layer 106 may be expressed, as follows:

$$\text{Magnetic Reluctance of Dielectric Layers} = 2 * \frac{l_{air}}{1} * \frac{1}{\mu_0 A_e}, \quad (3)$$

in which "$l_{air}$" corresponds to the magnetic flux path length through the dielectric layer 106.

Moreover, the ratio of the "magnetic reluctance of magnetic layers" (see equation (2)) to the "magnetic reluctance of dielectric layers" (see equation (3)) may be expressed, as follows:

$$\frac{\text{Magnetic Reluctance of Magnetic Layers}}{\text{Magnetic Reluctance of Dielectric Layers}} = \frac{l_{mag}}{l_{air}} * \frac{1}{\mu_{r\_mag}}. \quad (4)$$

If typical values for $l_{mag}$ (e.g., 450 μm), $l_{air}$ (e.g., 150 μm), and $\mu_{r\_mag}$ (e.g., 300) are substituted into equation (4), then the ratio of the "magnetic reluctance of magnetic layers" to the "magnetic reluctance of dielectric layers" for the conventional IM structure 100*a* may be expressed, as follows:

$$\frac{\text{Magnetic Reluctance of Magnetic Layers}}{\text{Magnetic Reluctance of Dielectric Layers}} = 1\%. \quad (5)$$

As indicated by equation (5), the percentage of the total magnetic reluctance of the conventional IM structure 100*a* due to the magnetic reluctance of the magnetic layers 102, 104 is about 1%. The magnetic reluctance of the conventional IM structure 100*a* is therefore primarily influenced by the high magnetic reluctance (i.e., the air gap reluctance) of the dielectric layer 106, which can be up to about 99% of the total magnetic reluctance of the conventional IM structure 100*a*.

Such high magnetic reluctances of dielectric layers in conventional IM structures can be detrimental to providing small, power-efficient IM structures with good electromagnetic interference (EMI) performance and high quality factors. For example, to overcome the high magnetic (i.e., air gap) reluctance of a dielectric layer in a conventional IM structure, the physical cross-sectional area of the conventional IM structure may have to be increased, possibly preventing the conventional IM structure from being used in highly integrated electromagnetic designs. Further, the high magnetic reluctance of the dielectric layer may cause significant magnetic leakage, possibly reducing the power efficiency and/or the quality factor of the conventional IM structure. In addition, the high magnetic reluctance of the dielectric layer may adversely affect the EMI performance of the conventional IM structure.

FIG. 1*b* depicts a cross-sectional view of another conventional integrated magnetics (IM) structure 100*b*. As shown in FIG. 1*b*, the conventional IM structure 100*b* includes a top dielectric layer 120, a bottom dielectric layer 122, and a magnetic layer 124 disposed between the top dielectric layer 120 and the bottom dielectric layer 122. The conventional IM structure 100*b* further includes a conductive layer 126 and a conductive layer 128, each of which is etched to form patterned metal (e.g., copper) traces in the respective conductive layers 126, 128. For example, the conventional IM structure 100*b* may correspond to at least part of an inductor or a transformer, in which the copper traces in the respective conductive layers 128, 126 are configured to be at least partially embedded in the top and bottom dielectric layers 120, 122, respectively, and wrapped along the (bar-shaped) magnetic layer 124.

As further shown in FIG. 1*b*, a first magnetic flux can be generated along a path 130, and a second magnetic flux can be generated along a path 132, through the conventional IM structure 100*b*. For example, the magnetic flux path 130 may traverse (i) through the magnetic layer 124, (ii) through the top dielectric layer 120, (iii) through the air above the top dielectric layer 120, and (iv) again through the top dielectric layer 120, thereby effectively encircling, in a clockwise fashion, a first set of copper windings formed in the conductive layer 128. Further, the magnetic flux path 132 may traverse (i) through the magnetic layer 124, (ii) through the bottom dielectric layer 122, (iii) through the air below the bottom dielectric layer 122, and (iv) again through the bottom dielectric layer 122, thereby effectively encircling, in a counter-clockwise fashion, a second set of copper windings formed in the conductive layer 126. However, the top and bottom dielectric layers 120, 122 of the conventional IM structure 100*b*, as well as the air above and below the respective dielectric layers 120, 122, have high magnetic reluctances that can be detrimental to providing small, power-efficient IM structures with good electromagnetic interference (EMI) performance and high quality factors.

FIGS. 2*a*-2*e* depict cross-sectional views of an illustrative embodiment of an exemplary IM structure (referred to herein in connection with reference numeral 200) during sequential phases 200*a*-200*e* of fabrication. The IM structure 200 is configured as an integrated laminate structure that can overcome at least some of the detrimental effects of high magnetic reluctances generally found in conventional IM structures. As shown in FIG. 2*a*, the IM structure 200 in a first phase 200*a* of fabrication can include a first plurality of conductive layers 202 and a second plurality of conductive layers 204. Each of the first plurality of conductive layers 202 can be etched to form patterned metal (e.g., copper) traces in the respective conductive layers 202. Likewise, each of the second plurality of conductive layers 204 can be etched to form patterned metal (e.g., copper) traces in the respective conductive layers 204. Once the patterned copper traces are etched in the respective conductive layers 202, 204, the first and second pluralities of conductive layers 202, 204 can be laminated together and embedded in a dielectric layer, such as an epoxy resin layer 209. In one embodiment, the IM structure 200 can correspond to at least part of a single inductor, coupled inductor, or multiple inductors, and the patterned copper traces formed in the conductive layers 202, 204 can correspond to one or more sets of windings for the single or multiple inductors. In another embodiment, the IM structure 200 can correspond to at least part of a transformer, and the patterned copper traces formed in the conductive layer 202 can correspond to a primary winding of the transformer, while the patterned copper traces formed in the conductive layer 204 can correspond to a secondary winding of the transformer. In inductor designs that do not require a secondary winding, the conductive layer 204 can be connected to the conductive layer 202 as part of the total winding. It is noted that a metal (e.g., copper) via 206 can be configured to vertically interconnect the windings of the conductive layers 202. Similarly, a metal (e.g., copper) via 208 can be configured to vertically interconnect the windings of the conductive layers 204.

Figure 2B:
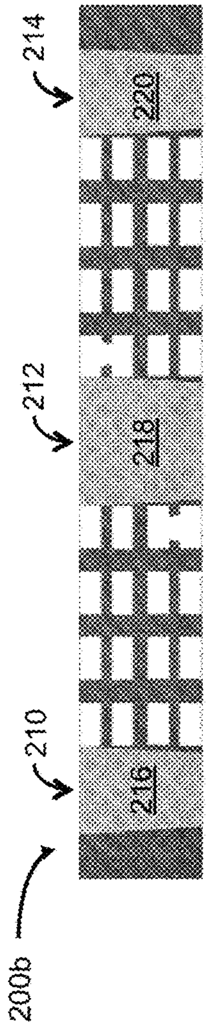

As shown in FIG. 2*b*, the IM structure 200 in a second phase 200*b* of fabrication can be cut to form a plurality of openings 210, 212, 214 for a plurality of magnetic vias 234, 236, 238 (see FIG. 2*d*), respectively. For example, the plurality of openings 210, 212, 214 may be formed by cutting the epoxy resin layer 209 of the IM structure 200 using a laser drilling technique, a CNC mechanical milling technique, or any other suitable technique. Before providing the plurality of magnetic vias 234, 236, 238 in the respective openings 210, 212, 214, each opening 210, 212, 214 can be filled with an epoxy resin paste 216, 218, 220, respectively, which can then be cured to harden within the respective openings 210, 212, 214.

Figure 2C:
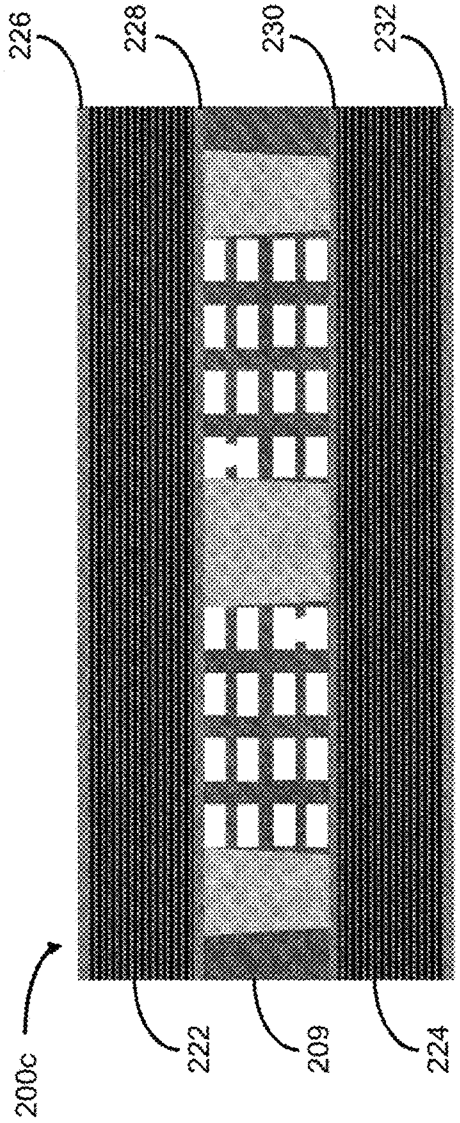

Having cured the epoxy resin paste filling the respective openings 210, 212, 214, the IM structure 200 can be provided with a dielectric layer 226, a magnetic layer 222, a dielectric layer 228, a dielectric layer 230, a magnetic layer 224, and a dielectric layer 232 (see FIG. 2*c*). As shown in FIG. 2*c*, the IM structure 200 in a third phase 200*c* of fabrication can include (i) the dielectric layer 228 disposed on top of the epoxy resin layer 209 (which includes the embedded conductive layers 202, 204, the openings 210, 212, 214, and the epoxy resin paste 216, 218, 220 filling the respective openings 210, 212, 214), (ii) the dielectric layer 230 disposed underneath the epoxy resin layer 209, (iii) the magnetic layer 222 disposed on top of the dielectric layer 228, (iv) the magnetic layer 224 disposed underneath the dielectric layer 230, (v) the dielectric layer 226 disposed on top of the magnetic layer 222, and (vi) the dielectric layer 232 disposed underneath the magnetic layer 224. The respective layers 226, 222, 228, 209, 230, 224, 232 of the IM structure 200 can then be laminated together under suitable heat (e.g., 150-240° C.) and pressure (e.g., 200-400 psi) to form the integrated laminate structure. For example, each of the dielectric layers 226, 228, 230, 232 may correspond to an adhesive epoxy sheet, a prepreg epoxy sheet, a polyimide film with epoxy on a surface thereof, or any other suitable dielectric sheet or film material. Further, each of the magnetic layers 222, 224 may correspond to an organic-based film compounded with epoxy (as a binder) and magnetic particles (as a filler), a magnetic film casted in a thin sheet, or any other suitable magnetic sheet or film material.

Figure 2D:
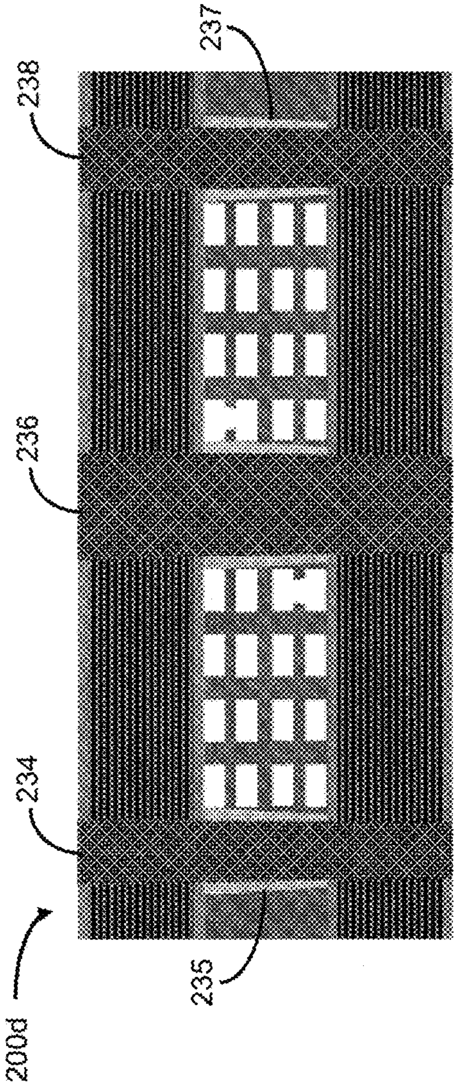

As shown in FIG. 2*d* with reference to a fourth phase 200*d* of fabrication, the IM structure 200 (i.e., the integrated laminate structure) can be drilled (e.g., by a laser) from top to bottom through the respective openings 210, 212, 214 (see FIG. 2*b*) to form a plurality of vertically extending holes in a predetermined punch-through type pattern. For example, the predetermined punch-through type pattern may have circular shapes, rectangular shapes, rounded-corner square shapes, or any other suitable shapes. Further, the ratio between the length and the width of a respective shape may range from about 1.2 to 3.5. The predetermined punch-through type pattern can be distributed or repeated in multiple identical shapes, which can promote balanced mechanical and/or thermal stresses during a lamination process. Having formed the plurality of vertically extending holes, each vertically extending hole can be filled with a magnetic paste to form a respective one of the plurality of magnetic vias 234, 236, 238. For example, the magnetic paste may be mixed with epoxy (as a binder) and magnetic particles (as a filler), or any other suitable binder and/or magnetic filler materials. The IM structure 200 including the plurality of magnetic vias 234, 236, 238 can then be cured under any suitable temperature profiling for the type of epoxy employed.

It is noted that the magnetic particles in the magnetic paste used to form the magnetic vias 234, 236, 238 can be made of ferrite, Fe—Ni alloy, Fe—Si—Al alloy, Fe—Si—Al—Cr alloy, Mn—Zn alloy, Cobalt-Zn, or any other suitable metal/metal alloy material. Further, the magnetic particles can have sizes ranging from about 100 nm to 35 μm. To achieve an acceptable tradeoff between viscosity and permeability, larger magnetic particles can be mixed with smaller magnetic particles. In addition, the relative permeability of the magnetic vias 234, 236, 238 can range from about 4 to 50, depending upon the composition of the magnetic particles, as well as the ratio of epoxy (binder) to magnetic particles (filler) in the magnetic paste mixture. It is further noted that, having formed the magnetic vias 234, 236, 238 in the respective vertically extending holes, each of the magnetic vias 234, 236, 238 can have a portion disposed in one of the openings 210, 212, 214 and surrounded by a wall of epoxy resin paste. For example, the magnetic via 234 may be surrounded by a wall 235 of epoxy resin paste, and the magnetic via 238 may be surrounded by a wall 237 of epoxy resin paste. The magnetic via 236 may similarly be surrounded by a wall (not numbered) of epoxy resin paste. Further, each such wall of epoxy resin paste may have a thickness ranging from about 10 μm to 80 μm, or any other suitable thickness, for providing voltage isolation between the magnetic vias 234, 236, 238 and the patterned copper traces in the respective conductive layers 202, 204. In addition, the spacing between the patterned copper traces and the walls of epoxy resin paste can range from about 20 μm to 500 μm. By controlling (i) the thickness of the walls of epoxy resin paste, and/or (ii) the spacing between the walls of epoxy resin paste and the patterned copper traces, voltage isolation levels ranging from about 500V to 15,000V can be achieved. In one embodiment, based on the precision level of the fabrication process, the walls of epoxy resin paste surrounding the magnetic vias 234, 236, 238 can be omitted, and a desired voltage isolation level can be achieved by controlling the spacing between the patterned copper traces and the respective magnetic vias 234, 236, 238.

Figure 2E:
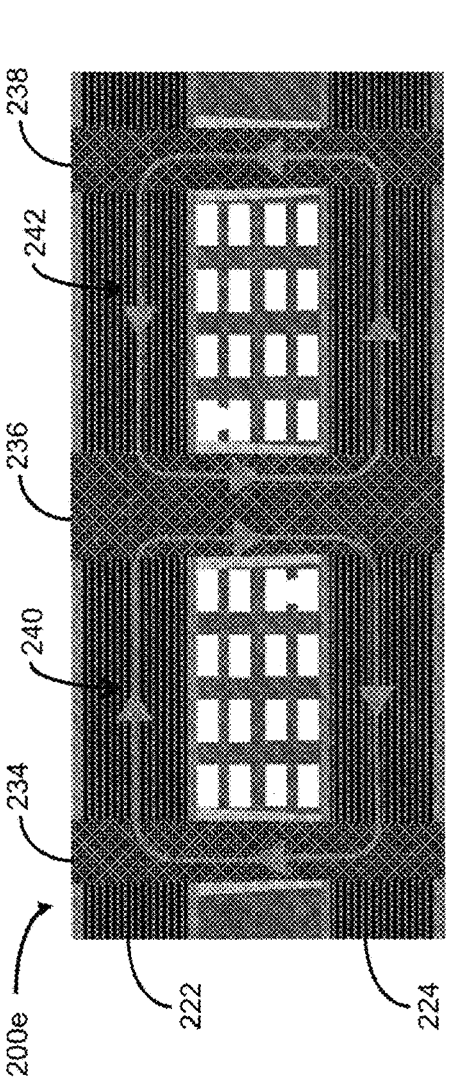

As shown in FIG. 2*e*, the IM structure 200 in a final phase 200*e* of fabrication can accommodate a first magnetic flux generated along a path 240, as well as a second magnetic flux generated along a path 242. For example, the magnetic flux path 240 may traverse (i) horizontally through the top magnetic layer 222, (ii) vertically through the magnetic via 236, (iii) horizontally through the bottom magnetic layer 224, and (iv) vertically through the magnetic via 234, thereby effectively encircling, in a clockwise fashion, a first set of copper windings formed in the conductive layers 202, 204. Further, the magnetic flux path 242 may traverse (i) horizontally through the top magnetic layer 222, (ii) vertically through the magnetic via 236, (iii) horizontally through the bottom magnetic layer 224, and (iv) vertically through the magnetic via 238, thereby effectively encircling, in a counter-clockwise fashion, a second set of copper windings formed in the conductive layers 202, 204.

Unlike the magnetic flux paths 114, 116 generated in the conventional IM structures 100*a*, 100*b*, the magnetic flux paths 240, 242 generated in the IM structure 200 do not traverse through any dielectric layer or the air. Rather, each of the magnetic flux paths 240, 242 generated in the IM structure 200 traverses in a closed magnetic loop formed by two of the magnetic vias 234, 236, 238 interconnecting the top magnetic layer 222 and the bottom magnetic layer 224 of the IM structure 200. For example, the magnetic flux path 240 may traverse in a closed magnetic loop formed by the two magnetic vias 234, 236 interconnecting the top and bottom magnetic layers 222, 224, and the magnetic flux path 242 may traverse in a closed magnetic loop formed by the two magnetic vias 236, 238 interconnecting the top and bottom magnetic layers 222, 224. Because the magnetic flux paths 240, 242 do not traverse any portion of the dielectric layers 226, 228, 230, 232 or the air, the magnetic reluctances along the respective magnetic flux paths 240, 242 are due solely to the magnetic layers 222, 224 and the magnetic vias 234, 236, 238. As described herein, the percentage of the total magnetic reluctance of an IM structure due to the magnetic reluctance of its magnetic layers can be low, e.g., about 1%. The total magnetic reluctance of the IM structure 200 is therefore significantly lower than the total magnetic reluctance of either of the conventional IM structures 100*a*, 100*b*, each of which accommodates magnetic flux paths that traverse through its dielectric layers and/or the air. Moreover, because non-magnetic materials are not disposed between the interconnections of the magnetic vias 234, 236, 238 and the top and bottom magnetic layers 222, 224, the overall magnetic permeability of the IM structure 200 is high.

Figure 3:
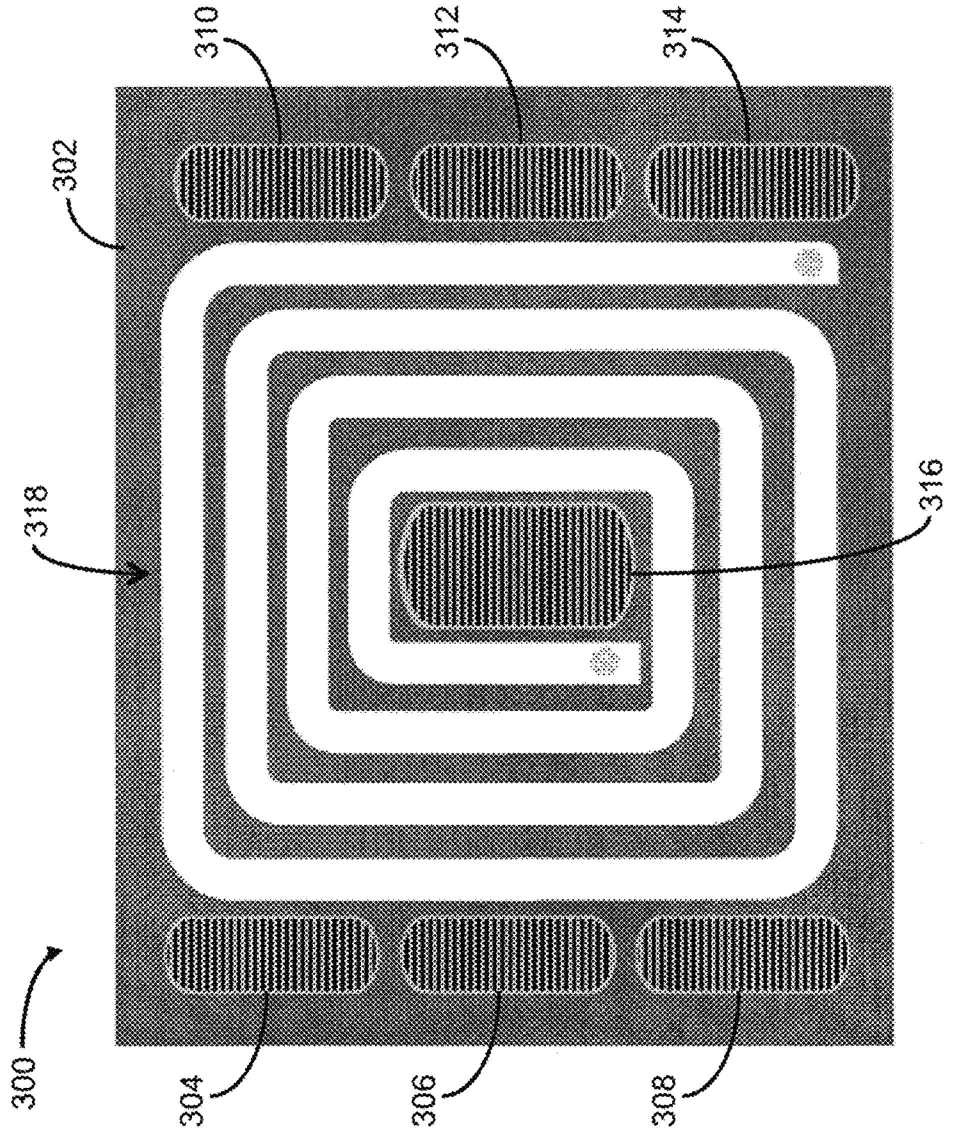
FIG. 3 illustrates the first exemplary IM structure of FIGS. 2*a*-2*e* configured as a transformer.

As described herein, the IM structure 200 can correspond to at least part of a transformer, and the patterned copper traces formed in the conductive layer 202 can correspond to a primary winding of the transformer, while the patterned copper traces formed in the conductive layer 204 can correspond to a secondary winding of the transformer. FIG. 3 depicts a top view of such a transformer 300. As shown in FIG. 3, the transformer 300 can include a dielectric layer 302, a plurality of magnetic vias 304, 306, 308, 310, 312, 314, and a patterned copper trace 318 formed in a conductive layer that can correspond to a primary (or secondary) winding of the transformer 300. Closed magnetic loops formed by the respective magnetic vias 304, 306, 308, 310, 312, 314 can provide improved coupling between a primary side and a secondary side of the transformer 300. The magnetic vias 304, 306, 308, 310, 312, 314 can also help to improve the EMI performance of the transformer 300, as well as improve the power transmitting efficiency from the primary side to the secondary side of the transformer 300.

Figure 4A:
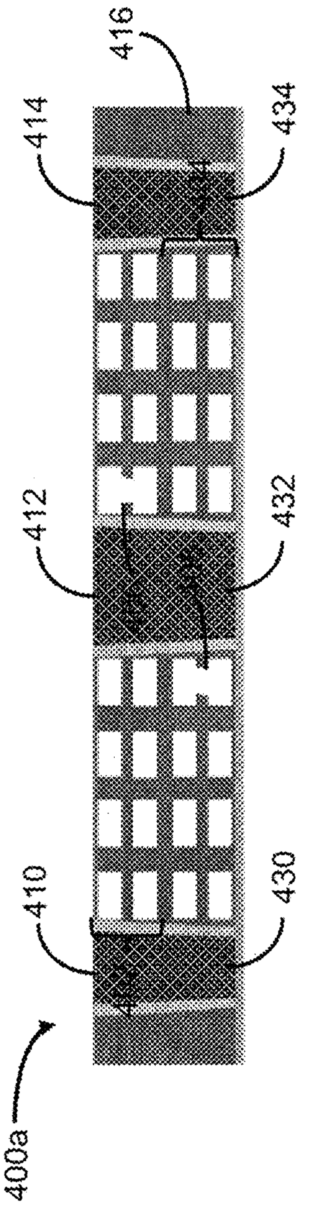
FIGS. 4*a*-4*c* illustrate a second exemplary IM structure during sequential phases of fabrication, in which the second exemplary IM structure is configured as an integrated laminate structure that includes a top magnetic layer, a bottom magnetic layer, a plurality of magnetic vias disposed between the top and bottom magnetic layers, a first dielectric layer disposed between the plurality of magnetic vias and the top magnetic layer, and a second dielectric layer disposed between the plurality of magnetic vias and the bottom magnetic layer.
Figure 4B:
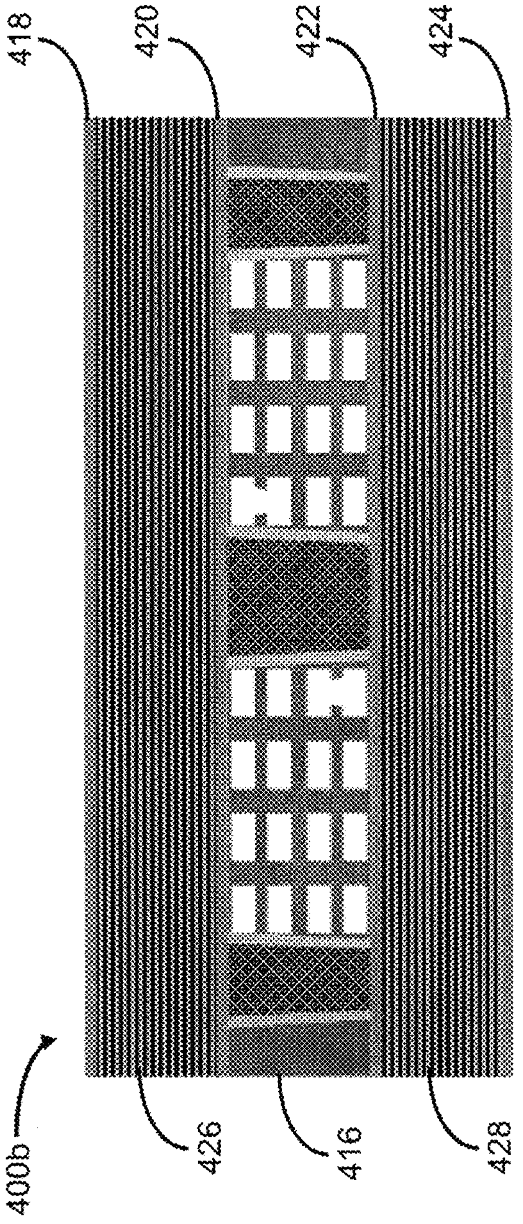
Figure 4C:
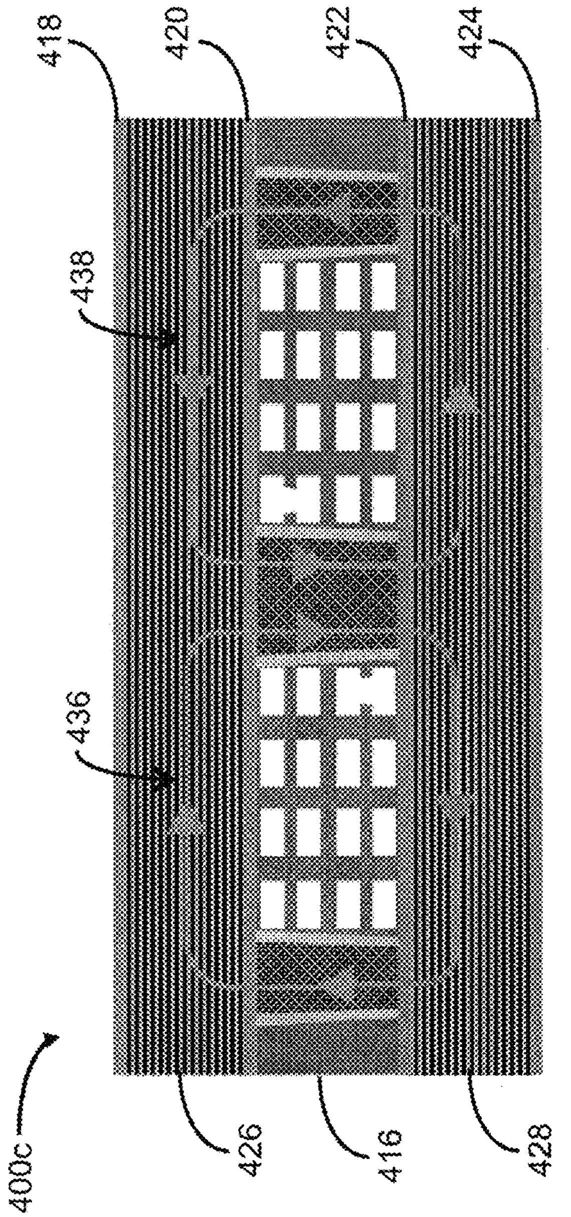

FIGS. 4*a*-4*c* depict cross-sectional views of an illustrative embodiment of another exemplary IM structure (referred to herein in connection with reference numeral 400) during sequential phases 400*a*-400*c* of fabrication. Like the IM structure 200 (see FIGS. 2*a*-2*e*), the IM structure 400 is configured as an integrated laminate structure that can overcome at least some of the detrimental effects of high magnetic reluctances generally found in conventional IM structures. As shown in FIG. 4*a*, the IM structure 400 in a first phase 400*a* of fabrication can include a first plurality of conductive layers 402 and a second plurality of conductive layers 404. Each of the first plurality of conductive layers 402 can be etched to form patterned metal (e.g., copper) traces in the respective conductive layers 402. Likewise, each of the second plurality of conductive layers 404 can be etched to form patterned metal (e.g., copper) traces in the respective conductive layers 404. Once the patterned copper traces are etched in the respective conductive layers 402, 404, the first and second pluralities of conductive layers 402, 404 can be laminated together and embedded in a dielectric layer, such as an epoxy resin layer 416. It is noted that a metal (e.g., copper) via 406 can be configured to vertically interconnect the windings of the conductive layers 402. Similarly, a metal (e.g., copper) via 408 can be configured to vertically interconnect the windings of the conductive layers 404.

As further shown in FIG. 4*a*, the IM structure 400 can be cut to form a plurality of openings 410, 412, 414 for a plurality of magnetic vias 430, 432, 434 (see FIG. 4*a*), respectively. Further, as described herein with reference to the IM structure 200 (see FIGS. 2*a*-2*e*), before providing the plurality of magnetic vias 430, 432, 434 in the respective openings 410, 412, 414, each opening 410, 412, 414 can be filled with an epoxy resin paste, which can then be cured to harden within the opening 410, 412, 414. Having cured the epoxy resin paste filling the respective openings 410, 412, 414, the IM structure 400 (i.e., the integrated laminate structure) can be drilled from top to bottom through the respective openings 410, 412, 414 to form a plurality of vertically extending holes in which the respective magnetic vias 430, 432, 434 can be formed (such as by filling the vertically extending holes with magnetic paste, which is then cured). It is noted that a wall of epoxy resin paste can surround each of the magnetic vias 430, 432, 434 formed in the respective vertically extending holes.

Once the magnetic paste filling the vertically extending holds is cured (i.e., once the magnetic vias 430, 432, 434 are formed), the IM structure 400 can be provided with a dielectric layer 418, a magnetic layer 426, a thin dielectric layer 420, a thin dielectric layer 422, a magnetic layer 428, and a dielectric layer 424 (see FIG. 4*b*). As shown in FIG. 4*b*, the IM structure 400 in a second phase 400*b* of fabrication can include (i) the dielectric layer 420 disposed on top of the epoxy resin layer 416 (which includes the embedded conductive layers 402, 404, and the magnetic vias 430, 432, 434), (ii) the dielectric layer 422 disposed underneath the epoxy resin layer 416, (iii) the magnetic layer 426 disposed on top of the dielectric layer 420, (iv) the magnetic layer 428 disposed underneath the dielectric layer 422, (v) the dielectric layer 418 disposed on top of the magnetic layer 426, and (vi) the dielectric layer 424 disposed underneath the magnetic layer 428. The respective layers 418, 426, 420, 416, 422, 428, 424 of the IM structure 400 can then be laminated together under suitable heat and pressure to form the integrated laminate structure. Each of the dielectric layer 420 and the dielectric layer 422 can be an adhesive epoxy film having a thickness of about 5 μm to 50 μm. The thickness of the dielectric layers 420, 422 helps to control the majority of the reluctance in the flux path and limit the flux density from reaching the magnetic saturation level of the magnetic layers 426, 428.

As shown in FIG. 4*c*, the IM structure 400 in a final phase 400*c* of fabrication can accommodate a first magnetic flux generated along a path 436, as well as a second magnetic flux generated along a path 438. For example, the magnetic flux path 436 may traverse (i) horizontally through the top magnetic layer 426, (ii) vertically through the dielectric layer 420, (iii) vertically through the magnetic via 432, (iii) vertically through the dielectric layer 422, (iv) horizontally through the bottom magnetic layer 428, (v) vertically again through the dielectric layer 422, (vi) vertically through the magnetic via 430, and (vii) vertically again through the dielectric layer 420, thereby effectively encircling, in a clockwise fashion, a first set of copper windings formed in the conductive layers 402, 404. Further, the magnetic flux path 438 may traverse (i) horizontally through the top magnetic layer 426, (ii) vertically through the dielectric layer 420, (iii) vertically through the magnetic via 432, (iii) vertically through the dielectric layer 422, (iv) horizontally through the bottom magnetic layer 428, (v) vertically again through the dielectric layer 422, (vi) vertically through the magnetic via 434, and (vii) vertically again through the dielectric layer 420, thereby effectively encircling, in a counter-clockwise fashion, a second set of copper windings formed in the conductive layers 402, 404. Unlike the magnetic flux paths 240, 242 that traverse through the IM structure 200 (see FIG. 2*e*), the magnetic flux paths 436, 438 of the IM structure 400 can traverse portions of one or more dielectric layers. For example, each of the magnetic flux paths 420, 422 may traverse portions of both the dielectric layer 420 and the dielectric layer 422. Nonetheless, the magnetic vias 430, 432, 434 included in the IM structure 400 can still be effective in reducing the total magnetic reluctance of the IM structure 400, so long as the dielectric layers 420, 422 are kept thin (e.g., in a range of about 10-50 μm). Indeed, if the magnetic vias 430, 432, 434 were omitted from the IM structure 400, then the inductance density of the IM structure 400 would increase by a factor of up to 8.

The fabrication techniques disclosed herein can be used to incorporate inductor and/or transformer functions of power electronics, high frequency analog ICs, among others, onto small IM structures, while maintaining both a high quality factor of the inductive elements and a high inductance density. The disclosed fabrication techniques can include incorporating magnetic vias into the inductive elements to form closed magnetic loops configured to reduce the total magnetic reluctance, thereby increasing the inductance of the inductive elements. The small IM structures can be configured as integrated laminate structures, in which multiple layers of semiconductor chips, magnetic layers, capacitive layers, conductive layers, and/or dielectric layers are vertically laminated together to form electronic circuits for use in smart phones, tablet computers, notebook computers, wearable electronic devices, portable medical devices, server computers, networking equipment, industrial equipment, and/or any other suitable devices, computers, systems, and/or equipment.

Such integrated laminate structures can include magnetic layers disposed at the top and at the bottom of the respective structures, and magnetic vias configured to interconnect the top and bottom magnetic layers, thereby forming one or more closed magnetic loops for the magnetic flux through the integrated laminate structures. The integrated laminate structures can further include one or more conductive layers etched to form patterned copper traces in the respective conductive layers. Thin dielectric walls can vertically surround the magnetic vias to provide voltage isolation between the magnetic vias and the patterned copper traces in the respective conductive layers. The magnetic vias can also be disposed at predetermined locations in the integrated laminate structure to provide electromagnetic coupling among the magnetic vias, the top magnetic layer, the bottom magnetic layer, and/or the patterned copper traces of the respective conductive layers. Moreover, the magnetic coupling coefficient can be increased between primary windings and secondary windings formed by the patterned copper traces, thereby reducing leakage inductance and improving EMI performance.

Figure 5:
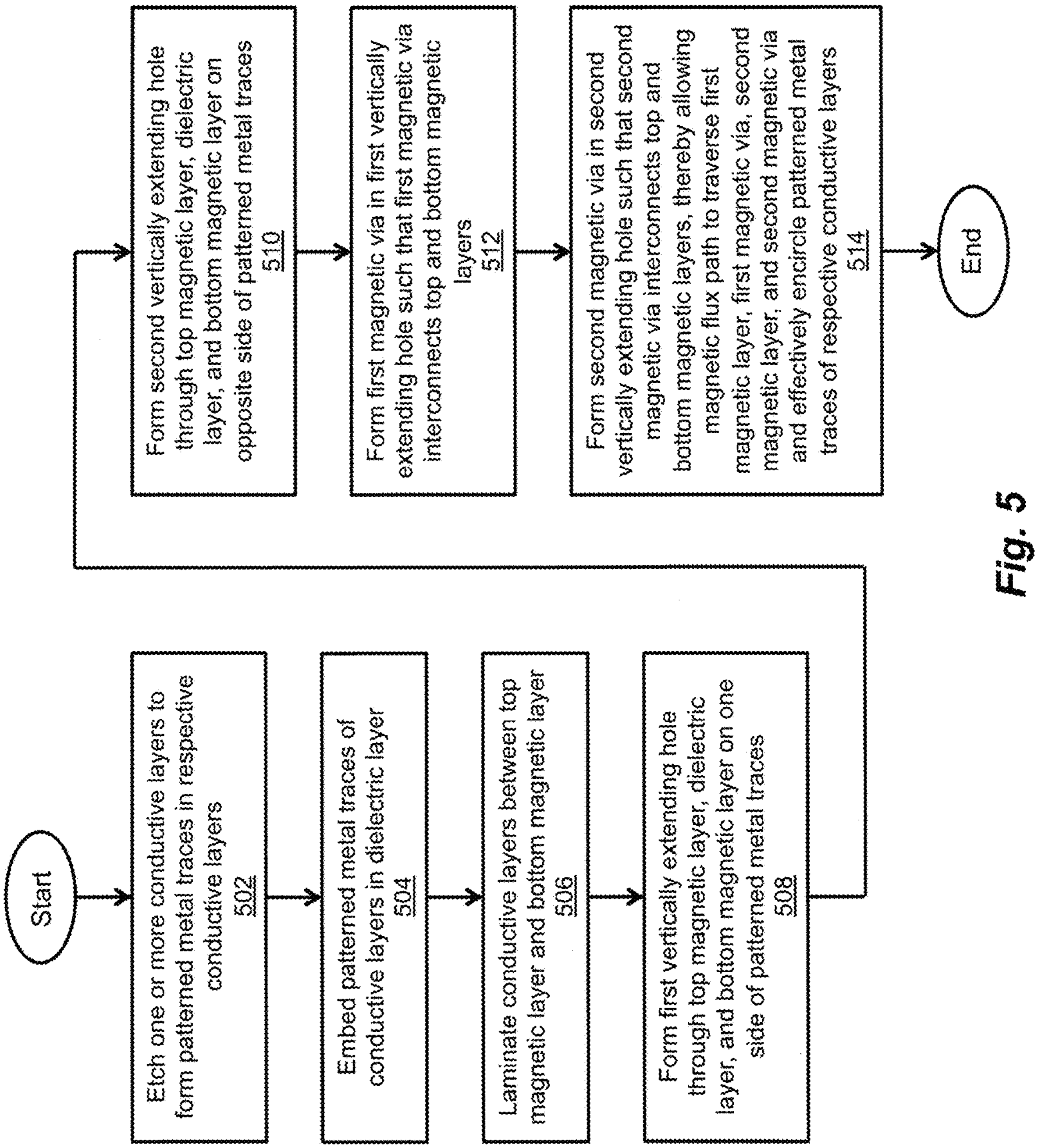
FIG. 5 is a flow diagram of an exemplary method of fabricating an IM structure.

A method of fabricating an IM structure is described below with reference to FIG. 5. As depicted in block 502, one or more conductive layers are etched to form patterned metal traces in the respective conductive layers. As depicted in block 504, the patterned metal traces of the conductive layers are embedded in a dielectric layer. As depicted in block 506, the conductive layers are laminated between a top magnetic layer and a bottom magnetic layer. As depicted in block 508, a first vertically extending hole is formed through the top magnetic layer, the dielectric layer, and the bottom magnetic layer on one side of the patterned metal traces. As depicted in block 510, a second vertically extending hole is formed through the top magnetic layer, the dielectric layer, and the bottom magnetic layer on an opposite side of the patterned metal traces. As depicted in block 512, a first magnetic via is formed in the first vertically extending hole such that the first magnetic via interconnects the top and bottom magnetic layers. As depicted in block 514, a second magnetic via is formed in the second vertically extending hole, such that the second magnetic via interconnects the top and bottom magnetic layers, thereby allowing a magnetic flux path to traverse the first magnetic layer, the first magnetic via, the second magnetic layer, and the second magnetic via and effectively encircle the patterned metal traces of the respective conductive layers.

While various embodiments of the disclosure have been particularly shown and described, it will be understood by those skilled in the art that various changes in form and details may be made therein without departing from the scope of the disclosure, as defined by the appended claims.

What is claimed is:

1. An integrated magnetics (IM) structure, comprising:

a first magnetic layer;

a second magnetic layer;

a first dielectric layer disposed between the first magnetic layer and the second magnetic layer;

one or more conductive layers etched to form patterned metal traces;

wherein the patterned metal traces are embedded in the first dielectric layer;

a first magnetic via; and a second magnetic via, wherein the first magnetic via is formed in a first hole that extends through the first magnetic layer, the first dielectric layer, and the second magnetic layer, wherein a first wall of dielectric material disposed in the first hole surrounds the first magnetic via, wherein the second magnetic via is formed in a second hole that extends through the first magnetic layer, the first dielectric layer, and the second magnetic layer, wherein a second wall of dielectric material disposed in the second hole surrounds the second magnetic via, wherein the first magnetic via, and the second magnetic via are disposed on opposite sides of at least a portion of the patterned metal traces, wherein a thickness of the first wall of dielectric material is configured to provide a level of voltage isolation between the first magnetic via and the patterned metal traces, wherein a thickness of the second wall of dielectric material is configured to provide the level of voltage isolation between the second magnetic via and the patterned metal traces, wherein each of the first magnetic via and the second magnetic via is configured to interconnect the first magnetic layer and the second magnetic layer, and wherein the patterned metal traces are configured, when electrical current flows through the patterned metal traces, to induce a magnetic flux through a flux path defined as a closed magnetic loop that traverses the first magnetic via, the first magnetic layer, the second magnetic via, and the second magnetic layer and encircles at least the portion of the patterned metal traces;

wherein a magnetic paste fills each of the first hole and the second hole, and the magnetic paste is a mixture of epoxy and magnetic particles.

2. The IM structure of claim 1 wherein the magnetic particles include larger magnetic particles and smaller magnetic particles, the respective magnetic particles having sizes ranging from about 100 nanometers (nm) to 35 nm.

3. The IM structure of claim 1 wherein the first wall of dielectric material includes epoxy resin paste disposed in the first hole to surround the first magnetic via.

4. The IM structure of claim 3 wherein the second wall of dielectric material includes epoxy resin paste disposed in the second hole to surround the second magnetic via.

5. The IM structure of claim 4 wherein each of the thickness of the first wall and the thickness of the second wall is configured to be in a range of about 10 micrometers (μm) to 40 μm.

6. The IM structure of claim 5 wherein the patterned metal traces are spaced apart from each of the first wall and the second wall by a distance ranging from about 20 μm to 500 μm.

7. The IM structure of claim 1 further comprising:

a second dielectric layer disposed between the first magnetic layer and the first dielectric layer.

8. The IM structure of claim 7 further comprising:

a third dielectric layer disposed between the first dielectric layer and the second magnetic layer.

9. The IM structure of claim 8 further comprising:

a fourth dielectric layer, wherein the first magnetic layer is disposed between the second dielectric layer and the fourth dielectric layer.

10. The IM structure of claim 9 further comprising:

a fifth dielectric layer, wherein the second magnetic layer is disposed between the third dielectric layer and the fifth dielectric layer.

11. The IM structure of claim 1 wherein the patterned metal traces are configured to form one or more sets of windings of one or more inductors.

12. The IM structure of claim 1 wherein the patterned metal aces are configured to form one or more sets of windings of a transformer.

13. A method of fabricating an integrated magnetics (IM) structure, comprising:

etching one or more conductive layers to form patterned metal traces;

embedding the patterned metal traces in a dielectric layer;

laminating the one or more conductive layers between a first magnetic layer and a second magnetic layer;

forming a first magnetic via in a first hole that extends through the first magnetic layer, the dielectric layer, and the second magnetic layer, a first wall of dielectric material being disposed in the first hole and surrounding the first magnetic via;

forming a second magnetic via in a second hole that extends through the first magnetic layer, the dielectric layer, and the second magnetic layer, a second wall of dielectric material being disposed in the second hole and surrounding the second magnetic via, the first magnetic via and the second magnetic via being formed on opposite sides of at least a portion of the patterned metal traces;

providing a level of voltage isolation between the first magnetic via and the patterned metal traces by configuring a thickness of the first wall of dielectric material; and providing the level of voltage isolation between the second magnetic via and the patterned metal traces by configuring a thickness of the second wall of dielectric material, each of the first magnetic via and the second magnetic via interconnecting the first magnetic layer and the second magnetic layer, thereby defining a flux path as a closed magnetic loop that traverses the first magnetic via, the first magnetic layer, the second magnetic via, and the second magnetic layer and encircles at least the portion of the patterned metal traces.

14. The IM structure of claim 1 wherein the first magnetic via is disposed at a first predetermined spacing from the patterned metal traces, the first predetermined spacing being configured to provide the level of voltage isolation between the first magnetic via and the patterned metal traces, and wherein the second magnetic via, is disposed at a second predetermined spacing from the patterned metal traces, the second predetermined spacing being configured to provide the level of voltage isolation between the second magnetic via and the patterned metal traces.

* * * * *